March 17, 1936.   B. G. KLUGH   2,034,582
METHOD AND APPARATUS FOR PRODUCING CHEMICAL SALTS
Filed Oct. 7, 1931   7 Sheets-Sheet 1

INVENTOR
B. G. Klugh
BY
Johnston & Jennings
ATTORNEYS

Fig. 2

March 17, 1936. B. G. KLUGH 2,034,582
METHOD AND APPARATUS FOR PRODUCING CHEMICAL SALTS
Filed Oct. 7, 1931 7 Sheets-Sheet 3

INVENTOR
B. G. Klugh
BY
Johnston & Jennings
ATTORNEYS

March 17, 1936. B. G. KLUGH 2,034,582
METHOD AND APPARATUS FOR PRODUCING CHEMICAL SALTS
Filed Oct. 7, 1931 7 Sheets-Sheet 5

INVENTOR
B.G.Klugh
BY
Johnston & Jennings
ATTORNEYS

March 17, 1936. B. G. KLUGH 2,034,582
METHOD AND APPARATUS FOR PRODUCING CHEMICAL SALTS
Filed Oct. 7, 1931 7 Sheets-Sheet 6

March 17, 1936.  B. G. KLUGH  2,034,582

METHOD AND APPARATUS FOR PRODUCING CHEMICAL SALTS

Filed Oct. 7, 1931  7 Sheets-Sheet 7

Fig. 11

INVENTOR
B. G. Klugh
BY
Johnston & Jennings
ATTORNEYS

Patented Mar. 17, 1936

2,034,582

UNITED STATES PATENT OFFICE 2,034,582

METHOD AND APPARATUS FOR PRODUCING CHEMICAL SALTS

Bethune G. Klugh, Birmingham, Ala., assignor to Swann Fertilizer Company, a corporation of Delaware Application October 7, 1931, Serial No. 567,437

12 Claims. (Cl. 23—1)

My invention relates to apparatus and a method for the production of chemical salts, salt mixtures and the like in a dry or paste form.

One object of my invention is to provide a method and apparatus which is particularly adapted to the production of chemical salts such as are ordinarily crystallized out of solutions, and by means of which such salts may be produced directly in solid form in predetermined proportions without the use of crystallizers, centrifuges and concomitant apparatus.

A further object of my invention is to provide apparatus for carrying out chemical and physical reactions in the production of salts, salt mixtures and the like, which shall include in compact form, among many other advantages which will become apparent, means for intimately contacting the reacting constituents of the salts, means for accurately controlling the conditions as to temperature and pressure under which the reactions take place, means for grinding the salts previous to the reactions, as the reaction proceeds or after reactions are completed, means for accurately controlling the moisture content of the salts, means for effecting evaporation, distillation, condensation and separation of volatile components currently or subsequently to reactions, means for kneading the salts into a workable paste for further processing, and mechanical means for quickly and readily charging the raw materials into, and emptying the apparatus of its finished product.

A still further object of my invention is to provide a method and apparatus for the production of predeterminedly proportioned homogeneous, non-segregable mixtures of chemical salts of different densities and specific gravities in the form of a paste adapted for further processing to produce relatively small dense particles which may be dried and stored for use and which maintain their predetermined proportions throughout a mass of such particles.

In my copending application, Serial No. 558,669, filed August 22, 1931, now Pat. No. 1,989,756, Feb. 5, 1935, I have illustrated and described a process for producing a fertilizer consisting in homogeneous mixtures of plant nutrient salts in drillable form, said fertilizer embodying potash and ammonium phosphate salts and in which the salts, at least in part, are produced by reacting together their chemical components, grinding the salts as the reaction proceeds, providing sufficient moisture content to form a paste, kneading the paste to a dough-like consistency, and extruding and drying the extruded paste to form dense particles of the salt mixtures.

The apparatus disclosed in this application is particularly useful in carrying out essential steps in the process of the before mentioned application and in addition thereto I have found that it provides means for effecting entirely new possibilities and economies in the production of a wide variety of salts such as the derivatives of phosphoric, sulphuric and other acids. This is due to the fact that a mass of extrudable salt paste has in its final stage such cohesive property that no conventional types of interacting blade type mixers can work it completely into required homogeneity. A further property of salt pastes, viz. that the salt and its paste forming solution separates under critical pressure exerted upon any appreciable mass thereof, renders the production of required homogeneity and consistency for extrusion, impossible with any of the pressure or calendaring types of corresponding functional equipment.

There are still further new contributions to the chemical industry presented through the hereindescribed apparatus, especially with the modifications and details set forth herein. These include:

(I) It provides means for directly utilizing forms, character and physical states of combining chemical compounds not hitherto practicable or commercial. For instance.

(a) In producing ammonium phosphate from gaseous ammonia and phosphoric acid, there has heretofore been a limit to the strength of phosphoric acid usable due to the fact that after any appreciable combination of the two components, the reacting mass becomes so viscous that it resists any stirring mechanism or known means of effecting the necessary intimacy of contact of the two bodies. With forced agitation of such a mass, it divides into aggregates which under continued reaction develop surface coatings impervious to penetration of either reacting component to the interior thereof. With the hereindescribed apparatus I am enabled to maintain such an intimacy of contact of the entire reacting mass of gaseous ammonia and phosphoric acid, of the highest concentration, that the reaction is completed to any controlled degree and with absolute uniformity throughout and in a fraction of the time required in hitherto known methods in which complete fluidity, hence dilution, is required.

(b) The direct combination of liquid anhydrous $NH_3$ and phosphoric acid is too violent for employment in any hitherto known reacting vessels. In the herein-described apparatus the dispersion of the contacting compounds throughout the mass is so complete as to render the use of these forms perfectly safe and controllable, as well as permitting economy in the use of the heat of vaporization of the liquid $NH_3$ in balancing the heat of neutralization.

(c) It is well known that anhydrous ammonia will carry in solution over three times its weight of ammonium nitrate, as well as other compounds at varying solubilities. This property presents potential economies in transportion costs, and other factors, but there appears to be no apparatus available in which such a solution may be utilized on account of the violence of the reaction of the liquid anhydrous ammonia solvent and the difficulty involved in handling such combination. With the hereindescribed apparatus the ammonia and salt solution may be directly utilized in combining the constituents thereof with acid or other compounds with perfect safety and control.

(d) The production of sodium phosphates directly from concentrated phosphoric acid and solid sodium carbonate or sodium hydrate, is not practicable in existing apparatus due to the violence of the reaction, the difficulty of effecting sufficiently complete contact in the resulting viscous reacting mass, and the elimination of $CO_2$ from the carbonate. With the hereindescribed apparatus the production of sodium phosphates in any degree of combination, starting with the liquid concentrated acid and most economical solid form of the sodium salts, can readily and controllably be carried out to the solid, pasty or liquid state of product in one operation.

(e) The production of ammonium nitrate requires a considerable dilution of nitric acid, in the usual crystallization process. With this apparatus the highest concentration of nitric acid may be used directly with anhydrous ammonia, and the salt completely combined in one operation. This is a particular valuable provision in conjunction with ammonia oxidation plants, where the nitric acid may be taken directly from the concentration and absorption towers into the hereindescribed apparatus. The construction of this apparatus is such that corrosion is avoided through provision of a saturated $NH_3$ atmosphere into which the nitric acid is introduced.

(f) The characteristics of this apparatus will suggest its application for numerous other chemicals, in certain form or physical state, which resist treatment in present available equipment. This will include gas-solid, solid liquid, gas-liquid, and combinations of the phases where violence of reaction, intermediate pasty or gummy stages of process, elimination of gaseous components and other otherwise heretofore insurmountable features are involved.

(II) Means of producing intermediate compounds in integral and fractional molecular ratios not possible in standard methods of production or in available equipment. For instance:

(a) Sodium, ammonium and potassium phosphates are almost universally prepared through crystallization from solution. The crystalline compounds only exist in specific molecular ratios, such as $NaH_2PO_4$, $Na_2HPO_4$, $Na_3PO_4$, with specific integral molecular ratios of $H_2O$ of crystallization. If a solution having frictional molecular ratios is subjected to crystallization, the separated crystals will be of varying integral molecular ratios, resulting in a mixture of definite compounds, such that the conversion of the entire lot of salts in solution to a homogeneous product, is not possible. With the hereindescribed equipment the desired proportions of the bases and acids are converted directly into a dry or pasty salt having a uniformity and homogeneity, with all practical effects of a definite chemical compound and in any desired fractional molecular ratio.

(b) The hydrates of salts exist in a limited number of integral molecular ratios of $H_2O$ with the equivalent anhydrous salts. This is inherent with the compounds formed in crystallization. Examples include: Trisodium phosphate, crystallizing as $Na_3PO_4$—$12H_2O$, sodium sulphate crystallizing with 10, 7, and 1 mols of $H_2O$ per mol of $Na_2SO_4$, chromium sulphate crystallizing with 18, 15, and 5 mols of $H_2O$ per mol of $Cr_2(SO_4)_3$. Where any different molecular ratios of $H_2O$ to the anhydrous salt is required, it is produced by heating or otherwise partially dehydrating the crystallized hydrous salt. Such results usually result in a mixture of various hydrates or requires expensive steps of melting and retreating. With the hereindescribed apparatus any desired intermediate or fractional molecular ratio of $H_2O$ to the equivalent anhydrous salt may be produced through control of the relative quantity of water, temperature and pressure required, and a finished product in dry or pasty state completed in a single operation. This may be done either from the salts previously crystallized or directly from the component raw materials.

(III) It provides means for performing, in a unified operation, several steps otherwise required separately, thereby eliminating costly and difficult transference of intermediate products in process. For instance:

(a) Where ammonia is derived from aqua ammonia, for combination with phosphoric or other acids, it is usually necessary to distill the ammonia gas from the aqueous solution in extraneous equipment. With this apparatus this distillation step is performed by flowing the aqua ammonia through a section of the apparatus whereby the evolved $NH_3$ gas goes directly into combination. The heat of neutralization is further utilized in the distillation heat requirement.

(b) In producing trisodium phosphate the usual procedure consists in first making disodium phosphate with $Na_2CO_3$ and $H_3PO_4$, in which step the $CO_2$ is driven off, then the solution of disodium phosphate is transferred and treated with NaOH to trisodium phosphate. This is then followed by crystallization with circulation of the mother liquor with the NaOH addition. In the presently described apparatus all the stages are carried out in two steps in the same apparatus with no transference, circulation or employment of any solutions. Furthermore, the raw materials used are the solid salts and liquid acid. This may be followed in the same apparatus with dehydration of the salt to any desired exact ratio, thus further carrying out steps usually requiring transference and additional operations in additional apparatus.

(c) Many organic chemical production operations involve the conducting of reactions in solution of volatile solvents with separate operating steps in separate apparatus, of solution, reaction, distilling of solvent, resolution to remove pasty state product from distilling equipment, and evaporation. All these steps may be carried out in the hereindescribed apparatus and the product in pasty or powdered state removed therefrom, in economical and effective cycles.

Many other combinations of reactions, uses of certain forms of materials and elimination of operating steps in standard practice will suggest themselves in this apparatus.

Apparatus embodying features of my invention is illustrated in the accompanying drawings, forming a part of this application, in which.

Referring to the drawings for a better understanding of my invention, my improved apparatus consists in a supporting frame structure comprised preferably of vertical structural steel members 10, and horizontal structural members 11. The frame supports a pressure resistant enclosure 12 having a cover 13, and a bottom 14. The enclosure 12 may be made of plate metal of a suitable strength and thickness to withstand the contemplated pressure within the enclosure and, as is well understood, when operating with certain materials, have its inner surfaces at least lined or alloyed to withstand the chemical action of such materials.

Disposed beneath the enclosure 12 is a gear box 16 in which is journaled a vertical shaft 17 driven through a gear 18 and pinion 19 from any suitable source of power, not shown. The shaft 17 is supported in its vertical position by a suitable thrust bearing 21. In order to resist the escape of pressure from within the enclosure 12, a stuffing box 22 is provided surrounding the shaft 17 where it passes through the bottom 14. The bottom 14 is provided with a downwardly projecting section 14a, provided for removal of drive mechanism, and supplying an auxiliary liquid seal pan 14b.

On the upper end of the shaft 17 is a hub member 23 having as an integral part thereof an annular ring 24 upon which is supported a mixing pan 26, being joined to the bottom 27 thereof by any suitable means. Joined to the lower end of the side wall of the pan 26 is a second bottom member 28 which is joined to the ring 24 at 29 in order to form a hollow chamber between the members 27 and 28. Disposed between the bottom members 27 and 28 is a baffle member 31 which is also supported from the ring 24 and to sides of supporting ribs 30 between 27 and 28, and this baffle also extends across the inner section of ring 24. The ring 24 is provided with ports 32 and 33 below and above the baffle member 31 respectively, and the shaft 17 is made hollow with a swivel water inlet connection thereto at the bottom thereof as shown at 34.

A second hollow shaft 36 is joined to the bottom 27 of the pan 26 and extends outwardly through the cover 13 of the enclosure 12. A stuffing box 37 surrounding the shaft 36 prevents the escape of pressure from the enclosure 12 around the shaft 36. Heat transfer medium introduced through the swivel connection 34 through the hollow shaft 17 passes through the ports 32 around the baffle 31, through the ports 33 and out through the hollow shaft 36 and through a swivel connection 39, thereby making complete contact of flowing heat transfer medium with the bottom of pan 27.

The arrangement just described may be utilized for either cooling or heating the bottom 27 of the pan 26, depending upon the reaction being carried out. If ammonium phosphate salts are being produced by the reaction of phosphoric acid and ammonia, there is, as is well known, a considerable heat of reaction and it may be desirable to pass cooling water in the manner just described to hold the temperature within the enclosure 12 down to that for best operating conditions. With production of certain other salts, it may be found desirable to add heat to the reacting mixture and this may be accomplished by passing steam through the shaft 17 and hollow bottom of the pan 26 in the manner described.

Joined to the side wall of the enclosure 12 and extending inwardly to overhang the upper edge of the pan 26 is a deflecting ring 41 for directing any condensate forming within the enclosure 12 back into the pan 26. Mounted on top of the enclosure 12 is a hopper 42 communicating with a chamber 43 by means of a valve 44. The chamber 43 communicates with the interior of the enclosure 12 through a conduit 46 and has disposed therein a valve 47. The structure just described may be employed for the introduction of solid constituents of the materials to be acted upon.

The valves 44 and 47 permit the introduction of these solid constituents into the enclosure without the escape of pressure from within. Adjacent the conduit 46 and hopper 43 are conduits 48 and 49 through which gaseous and liquid constituents of the materials utilized may be introduced into the enclosure 12, such for example as phosphoric acid and ammonia in gaseous or in liquid form. A third conduit 51 leading through the cover 13 of the enclosure 12 may be utilized for the introduction of water, water vapor, or steam through the interior of the enclosure 12 as the same may be needed in the carrying out of the reaction at hand.

Figure 3:
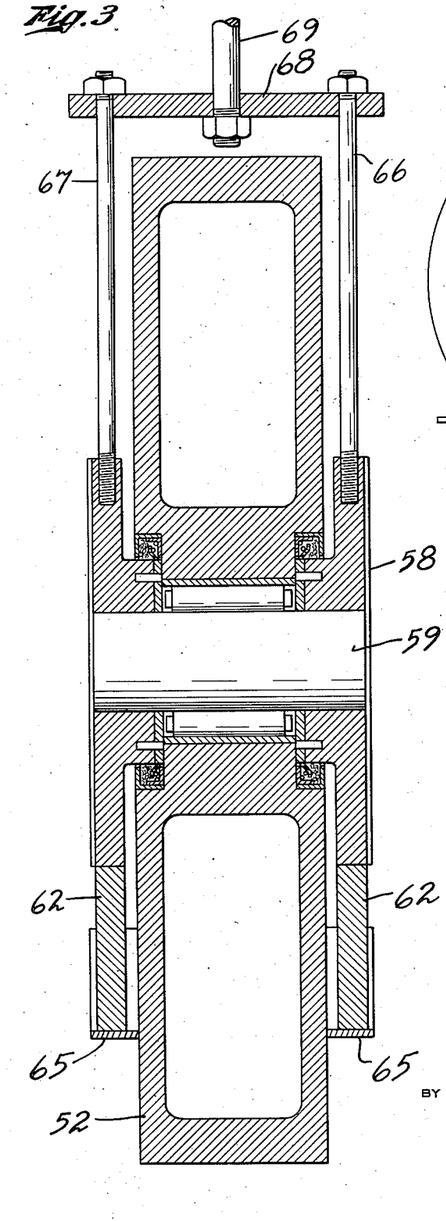
Fig. 3 is a detail sectional view showing the mounting of one of the muller rollers.
Figure 4:
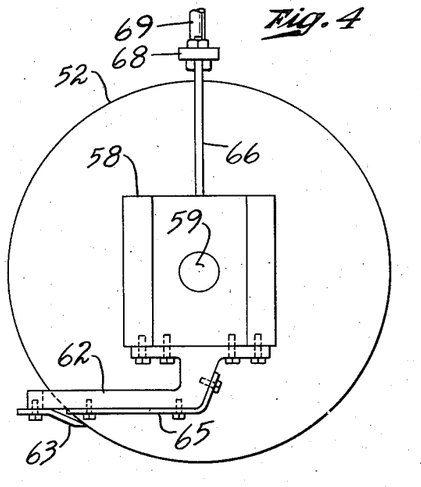
Fig. 4 is a side elevation of the roller illustrated in Fig. 3.
Figure 5:
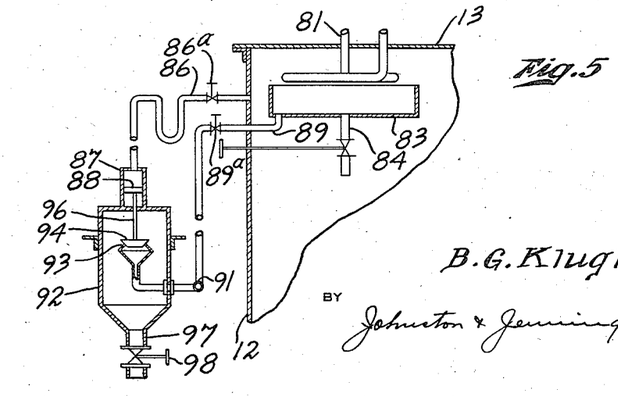
Fig. 5 is a detail view illustrating one means for heat transfer within the apparatus and for condensing, returning, retaining or removing water vaporized within the apparatus.

Mounted within the enclosure 12 are a plurality of muller rollers 52 which are adapted to roll in the pan 26 as the pan is rotated. These rollers are mounted by means of spaced structural steel members 53 joined to the sides of the enclosure 12 and extending transversely across the enclosure. Joining the members 53 are spaced plates 54 having joined thereto vertical guide members 56 and 57. Fitting between the guide members 56 and 57 are journal boxes 58 carrying axles 59 upon which are journaled the muller rollers 52. See Figs. 3 and 4. Thus each of the rollers 52 is mounted for free vertical movement independently of the other rollers of the assembly.

Figure 1:
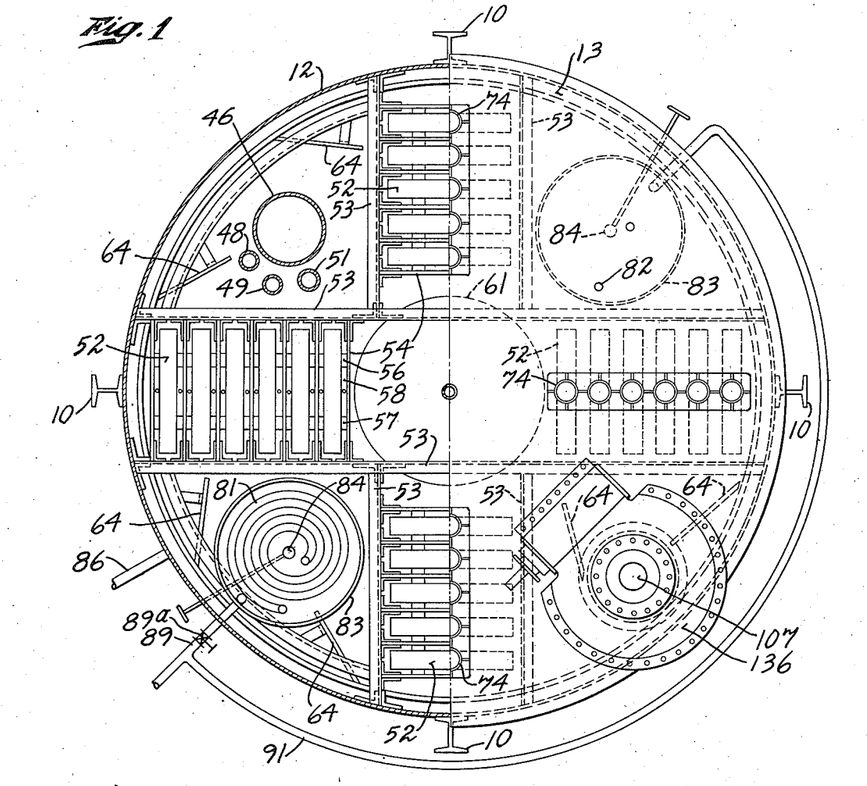
Fig. 1 is a sectional plan view of the apparatus.

The rollers 52 as shown in Fig. 1 are uniformly and closely spaced in sets along a full radius of the active revolving pan floor 27, and the respective sets are in symmetrical radial relation thereto. The respective rollers in each set are located on alternating annular surfaces described by the rotating pan floor, in relation to the respective corresponding rollers of the next succeeding set. The spaces between the adjacent rollers in each set is less than the width of the face of the roller, hence, the entire revolving pan floor area is subjected to action of the rollers, in passing under each two succeeding sets. In this particular example I have provided the pan floor with four sets of rollers, as described, so that in this case the entire area of the pan floor is under roller action twice in each revolution.

This feature is very important in the operation for which this apparatus is intended. In the various chemical reactions anticipated, the salts are, for at least a part of the time, in a coherent and adhesive pasty state. I have found that this pasty state material tends to cohere firmly to the surface of the pan floor accumulatively harder on annular areas that are not under roller action, whereas the material separates freely from annular surfaces subjected to roller action. This is a vital detail in maintaining homogeneity of the entire mass throughout all stages of the reactions being performed in this apparatus.

It is obvious that this arrangement effecting the complete subjection of all material in the pan to full and constant roller action, is productive of a high degree of efficiency and uniformity of results.

I have found by experience that for the kneading action herein referred to that a weight of about 300 to 500 pounds for rollers with a face width of 5 inches is conducive to best kneading action. Whereas any appreciable excess of this weight tends to compress the salt pastes so that its solutions separate, thereby producing masses of irregular composition. For grinding salts, weights in excess of 100 pounds per linear inch of roller to pan contacting surface is a waste of energy in carrying load, while for kneading a weight of 60 pounds per linear inch of contact may be set as a fair rule.

At the center of the pan 26, I provide a circular upwardly extending boss 61 which prevents material being acted upon being crowded toward the center of the pan out of the path of the roller assembly.

In order to prevent the sticking of materials to the rollers 52, I provide scrapers 62 joined to the journal boxes 58. These scrapers are provided with blades 63 bearing against the faces of the rollers, and with scraper bars 65 bearing against the sides of rollers 52 and thus serve to keep the rollers clean. It is noted these scrapers follow the muller roller in vertical movement.

I have found that for complete and efficient grinding and kneading action between the rollers and the pan, the position and arrangement of deflecting plates are an essential factor. With the pan running at comparatively high speed the material tends to all move toward the periphery by centrifugal force. It is therefore necessary to provide deflecting plates 64 arranged at intervals around the pan and supported in any suitable manner, in order to force the material back toward the center at exact distances and positions and thus to cause it to pass in a uniform layer distributed to all the rollers in each successive pass.

The material traveling at high velocity is deflected by the plates 64 toward the center, but the centrifugal force redirects it toward the periphery, so that the two components cause it to spread fanwise in a uniform layer across the path of the rollers, when the plates have proper position and angle. This position and angle of plates 64 is shown in approximately correct relation in Fig. 1. These deflecting plates are supported by any suitable hangers from above the line of the material.

An equally important function in these deflecting plates is that of effecting an intimate mixture of the cross section of the contents of the pan continuously so as to avoid any annular segregation, and thereby secure an absolutely homogeneous mixture of the entire mass, in processing stages and in final product.

In the production of chemical salts with apparatus such as is herein described, I have found it desirable and necessary in some instances to vary the effective weight of the rollers 52 on the materials in the pan 26. For example, when operating with dry materials introduced into the pan 26, followed by a chemical reaction to provide a mixture of salts, I first introduce the solid materials into the pan 26 and rotate the pan, allowing the full weight of the rollers 52 upon the material to grind it to suitable fineness, and introduce the other constituents of the salts for reaction into the pan 26, continuing the grinding as the reaction proceeds.

Figure 2:
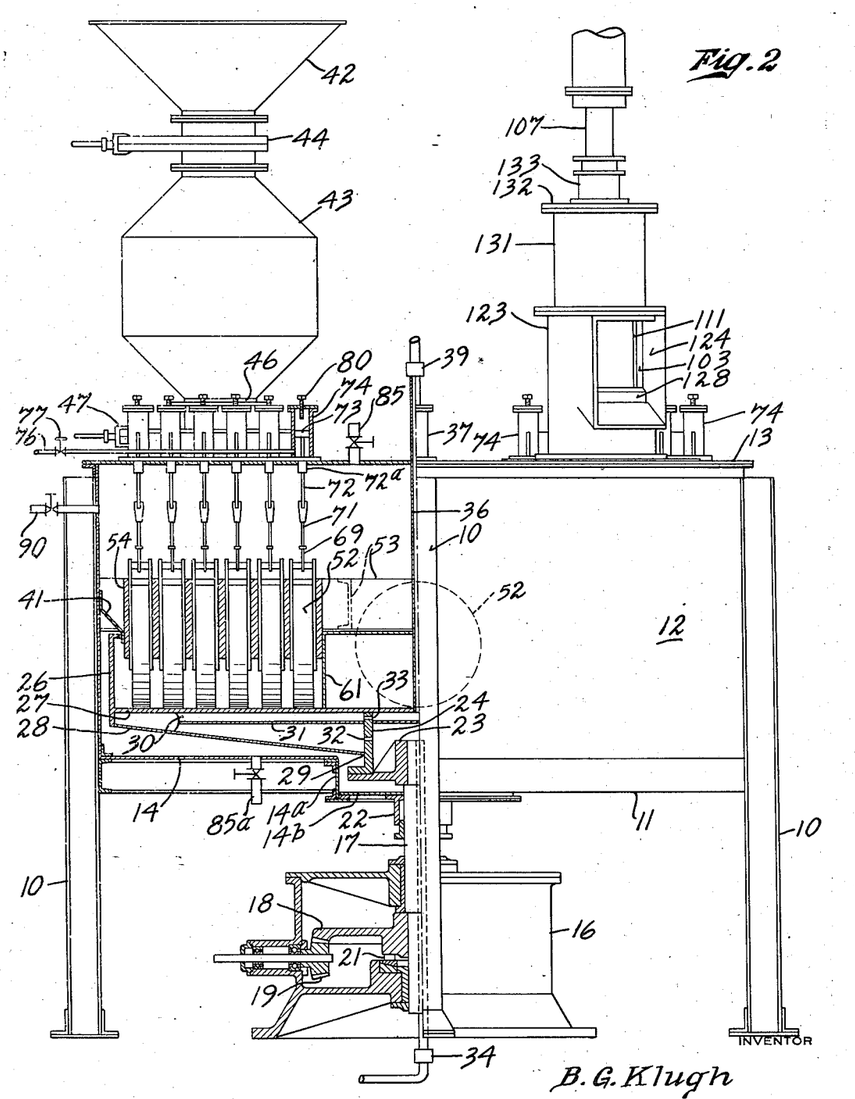
Fig. 2 is a sectional elevation of the same.

When the reaction is completed and the salt mixture is in a homogeneous finely divided state, I incorporate a sufficient amount of moisture thereinto to form a workable paste and knead the paste. In order to knead the paste, the full weight of the rollers 52 is not desirable and it is preferable to provide some means whereby the weight of the rollers may be counterbalanced. A convenient way of counterbalancing the weight of the rollers is illustrated in Fig. 2 taken with Figs. 3 and 4.

Joined to each of the journal boxes 58 are rods 66 and 67 connected at the top by a cross bar 68. Connected to the cross bar 68 is a rod 69 connected through a flexible member 71 to a piston rod 72. The piston rod 72 passes through the top 13 of the enclosing hood and its passage is sealed against escape of pressure from within by means of stuffing boxes 72a and is connected to a piston 73 disposed within an air cylinder 74. Air pressure to any suitable degree may be admitted to the cylinders 74 through a conduit 76 controlled by valve 77. The pressure within the cylinder 74 may thus be varied to offset to any desired degree the weight of the rollers 52 on the material in the pan, or the rollers may be raised entirely out of the way of the material as when the pan is to be unloaded in a manner to be described hereinafter, or when only stirring of the material under treatment is required. In order to limit the height to which the rollers may be raised in service and thus permit the full weight of the rollers upon large lumps or aggregates of material which may accumulate in the pan, I provide an adjusting screw 80 in each of the cylinders.

In the carrying out of certain chemical reactions, for example in the production of ammonium phosphate salts by the reaction of ammonia and phosphoric acid in the pan 26, there is considerable water evaporated by the heat of the reaction, the water being brought in with the phosphoric acid. In the formation and grinding of the salts forming this reaction, it is desirable that the water evaporated be retained for the most part and not returned immediately to the salts in the pan 26, or until it is desired to incorporate sufficient moisture in the salts to form a paste. I accordingly provide means whereby the water evaporated during the carrying out of the reaction may be retained and condensed within the enclosure 12 or removed therefrom as desired. I also provide means whereby such water as required may be returned to the reaction mixture for the purpose of forming a paste. It may also be necessary to add heat to the materials within the enclosure in the carrying out of certain reactions.

In order to accomplish the beforementioned purpose, I provide in the upper part of the enclosure 12, coils 81 and 82 through which suitable heat transfer medium may be passed to produce the desired effect. Where the coils are used for the condensation of water vapor, cooling water may be passed through the coils. Disposed beneath each of the coils 81 and 82 and supported from the side walls of the enclosure 12 is a container 83 into which the condenser water vapor falls by gravity. Leading from the bottom of each of the containers 83 is a valved conduit 84 by means of which the water may be returned to the mixing pan 26 as desired.

In event it is desired to remove the condensed water vapor from the container as it is condensed, I provide a conduit connection 86 to the upper part of the enclosure 12, said conduit 86 leading to a cylinder 87 having a piston 8 disposed therein so as to be subject to whatever pressure obtains within the enclosure 12. Leading from the bottom of the container 83 is a second conduit 89 which has connected thereto a conduit 91 leading from the other container 83. The conduit 89 is extended through the walls of a vessel 92 to terminate in a valve opening 93. The opening 93 is controlled by a valve 94 connected by a stem 96 to the piston 88. Leading from the bottom of the vessel 92 is a conduit 97 having a valve 98 disposed therein and controlling the discharge of water from the vessel 92.

It will be seen that whatever gaseous pressure obtains within the enclosure 12 will be transmitted to the piston 88 through the conduit 86 and to the under side of valve 94 through the conduit 89. The valve 94 is made of sufficient area so that the hydrostatic head of water within the conduit 89 will overcome the pressure upon the piston 88 and allow the water to overflow from the valve 93 into the vessel 92. It will thus be seen that when the valve 98 opens, water vapor is removed from the enclosure 12 as formed, responsive to the hydrostatic head of water within the conduit 89. Valves 86a and 89a are provided to close the respective pipes 86 and 89, to cut out this discharge system.

In order that the water and volatile constituents may be distilled off under partial vacuum, I provide a steam circuit through the enclosure 12 preferably with entry at the bottom at 85a and outlet at the top at 85. In this way I can pass steam into and through the enclosure so that substantially all the air therein may be replaced with steam. This evacuation of the air may be done after the introduction of the solid salts hereinbefore described or at any stage of the procedure desired.

In case of combination of phosphoric acid and ammonia, the two constituents are passed into the pan 26 in the air evacuated enclosure and the grinding and stirring operation continued until all the ammonia is in combination. In the meantime, the pressure in the enclosure is at atmospheric or higher pressure due to the volume of ammonia and the water vapor at temperatures around 70° to 80° C. in the entire enclosure. After the complete combination, the contents of the pan 26 are heated by passing hot water or steam through the pan jacket passage aforedescribed. The cooling water is then passed through the cooling pipes 81 and 82, whereupon the water evaporated within the pan is condensed upon the said pipes and drops into the receiving pan 83, from which it passes out through the exit pipe 89 under proper balanced control of pressure aforedescribed, or this water may be held in the pan and discharged after restoring atmospheric pressure in the enclosure when the evaporation is completed. It is obvious from this description that this procedure maintains a reduced pressure in the enclosure 12 during the entire evaporation period automatically through the condensation.

In addition to the reduced pressure automatically produced by above means, I propose providing a vacuum line 90 to the enclosure, which line is connected to any suitable vacuum production means, for further pressure reduction means within the enclosure 12.

It is obvious that with the equipment just described I am enabled to introduce solutions into the enclosed pan and evaporate them completely down to solid or paste form, while performing other reactions and working the products thereof into desired physical forms for further processing. This provides an advantage over other evaporating apparatus, in which the solutions are passed through evaporation treatment as such, requiring additional evaporation or crystallization to separate the solids from the liquids and usually a second handling of the dried product. In my apparatus I complete the full steps from the solution to the solid or paste product in a single handling and unified treatment, thereby effecting great economy in utilizing reaction and frictional heat for evaporation and obtaining reduced pressures for evaporation without extraneous equipment.

In case of separation of certain constituents that are gaseous when separated from the raw materials as introduced, for instance $CO_2$ from $Na_2CO_3$ when reacting with $H_3PO_4$ to form sodium phosphate, I employ the same details just described to further advantage. In such case I may introduce the sodium carbonate either as solid or in solution into the pan 26, then feed in the liquid phosphoric acid. The $CO_2$ is not readily eliminated from the reacting solution, where the evolved $CO_2$ fills the enclosure space thereabove, especially at atmospheric pressure or above. In order to accelerate the $CO_2$ evolution from these reacting materials, I pass air in at the pipe entry 85a at slightly less rate than I remove it through exit pipe 85. In this way the air passing lowers through partial pressure, the vapor pressure of the evolving $CO_2$ and accelerates its complete separation therefrom. I may also draw out the $CO_2$ through vacuum exit means without the additional air current.

Figures 6, 7:
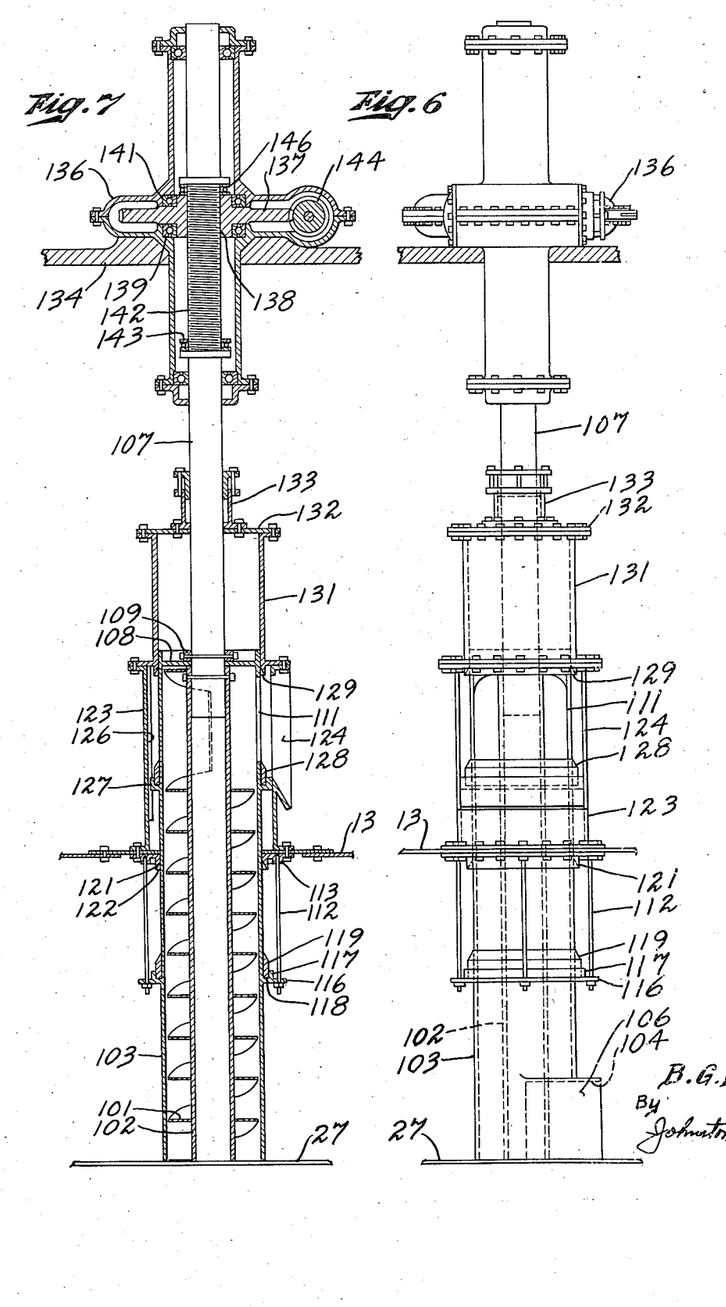
Fig. 6 is an elevational view of the unloader removed from the mixing and grinding apparatus.
Fig. 7 is a vertical sectional view of the unloader.

When the reaction within the enclosure 12 is completed and the product has been ground and kneaded to the desired extent, it is desirable that means be provided whereby the contents of the pan 26 may be quickly and readily removed in order to prepare the apparatus for the next succeeding batch. The apparatus which I preferably employ for the purpose is illustrated in Figs.

6 and 7 of the drawings. Referring to these figures, I show a vertically disposed screw conveyer 101 mounted upon a shaft 102 and surrounded by a casing 103. The casing 103 is provided with a side opening 104 near the bottom, the opening being preferably formed by cutting the casing vertically through the center of the desired opening and transversely to the desired extent and then flaring the sides 106 outwardly to form guiding means for directing the material into the casing. The opening 104 is disposed so as to face the material in the pan as the pan is rotated. Joined to the shaft 102 upon which the screw conveyer 101 is mounted is a driving shaft 107. The casing 103 is closed at its top by means of a plate 108 connected to the shaft 107 by means of collars 109 whereby when the shaft 107 is raised or lowered, it raises and lowers the casing 103. At the upper end of the casing 103 is a discharge opening 111 through which the material elevated by means of the screw 101 is discharged from the interior of the enclosure 12.

The casing 103 is supported against lateral displacement within the enclosure 12 and is guided therein by means of a plurality of bolts 112 joined at the top to a ring 113 secured to the cover of the enclosure 12 and extending through holes provided in a ring 116 rigidly secured to the casing 103. The ring 116 is provided with a shoulder 117 forming with the walls of the casing 103 a groove 118 in which is disposed a beveled packing ring 119 which may be made of soft rubber or other suitable material. The ring 113 is provided with a downwardly turned flange 121 beveled at its under terminus to form a groove 122 which receives the beveled packing ring 119 when the casing 103 and conveyer 101 is in its raised position and prevents the escape of pressure around the casing 103 from within the enclosure 12.

Mounted on top of the enclosure 12 and surrounding the casing 103 is a sleeve 123 having a side opening 124 adapted to register with the opening 111 of the casing 103 when the said casing and conveyer are in the lowered position. Materials being removed from the pan 26 are discharged through the opening 124 to any other suitable apparatus for further treatment. The casing 103 is prevented from turning with respect to sleeve 123 by means of a spline 126 on the sleeve 123, which spline coacts with a groove provided in a ring 127 carried by the casing 103.

The ring 127 carries a beveled packing ring 128 which is adapted to coact with a beveled seat 129 provided in the sleeve 123 when the casing and conveyer are in their raised position and thus prevents the escape of pressure from within the enclosure 12 up through the casing 103 to the exterior.

The upper end of the sleeve 123 is reduced in diameter at 131 to form a snug guide for the upper end of the casing 103 and is provided with a pressure tight cover 132. In order to prevent the escape of pressure from around the driving shaft 107, I provide a packing gland 133 on the upper end of the reduced portion 131 of the sleeve, surrounding the shaft 107.

The conveyer 101 and sleeve 103 are supported through the shaft 107 and are raised and lowered thereby by means which will now be described. At 134 is shown in section a suitable supporting member on which is mounted a gear box 136. Housed within the gear box 136 is a worm gear 137 internally threaded at 138 and mounted in ball bearings 139 and 141. A portion 142 of the upper end of the shaft 107 is threaded to fit the internal threads of the gear 138 so that as the gear is rotated in one direction, it serves to screw downwardly on the shaft 107, raising the shaft and conveyer 101 with the casing 103 until the gear reaches the lower end of the threads 142 when it bottoms against a ball bearing collar 143, thereby locking the gear with respect to the shaft and causing the shaft to turn. The conveyer is then in its raised position and the gear is stopped.

When it is desired to lower the conveyer 101 in the casing 103 to unload the pan 26, the gear 137 is driven through the worm gear 144 in the opposite direction, turning on the threads 142 until it reaches the upper end of said threads, as shown in the drawings, where it bottoms against a ball bearing collar 146, whereupon the shaft is revolved and the screw is in operating hoisting service. In this position, the casing 103 is adjacent the bottom of the pan 26 with the side opening 104 facing the material in the pan as the pan is rotated.

As will be noted from the drawings, the casing side opening 104 is disposed in coaction with a deflecting plate 64, so that the material in the pan is impelled into the opening 104 of the casing 103, and is elevated by means of the screw 101 and discharged through the opening 124. The unloader casing side opening is, as noted, located to register with the regular deflecting plate of the pan 26.

I have found that a vertical screw and casing with side opening about 1 screw turn in height and about ½ section of the casing in width and with the bottom of said screw and casing in close contact with a plane moving toward said opening will cause the upward turning screw to be filled and loaded for vertical conveyance of material carried by said plane.

By this means I have found that in a comparatively short period of time the entire contents of the pan 26 may be unloaded. When the unloading is completed the gear 137 is rotated in the opposite direction to raise the unloader out of the way of the materials in the pan and the apparatus is ready for the next succeeding batch or operation.

Figure 8:
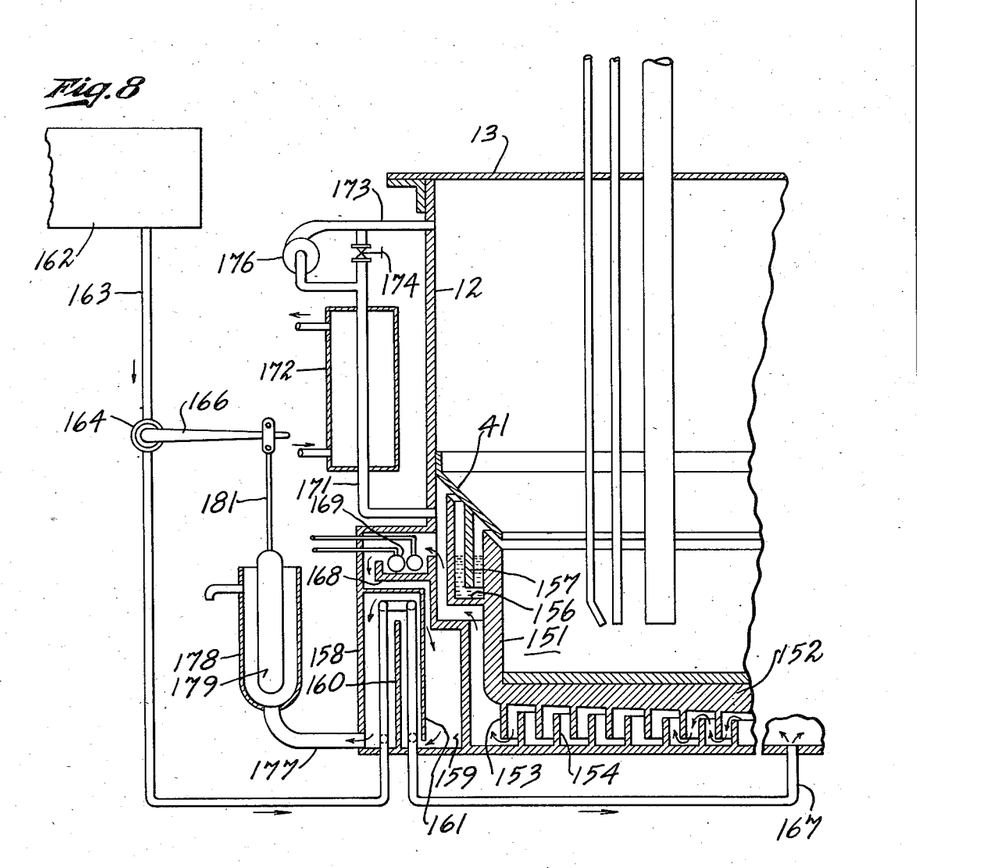
Fig. 8 is a view showing a modified form of mixing and grinding apparatus.

Referring to Fig. 8 of the drawings, I show a modified form of apparatus which is partcularly adapted to carry out certain reactions, wherein the heat of the reaction and the friction of working the materials under treatment is employed to distill off volatile constituents employed therein which may be carried in solution. For example, in the production of ammonium phosphate utilizing phosphoric acid and aqua ammonia, it is necessary to vaporize the ammonia out of its aqueous solution before introducing it into the enclosure 12 for reaction with the phophoric acid in the mixing pan. In this apparatus, there is utilized the same driving mechanism, rollers, feeding arrangements, etc., as has heretofore been described. This description, therefore, will be limited to points of difference in this modification distinguishing it from the apparatus heretofore disclosed.

At 151 I show a rotary mixing pan having a solid botom 152 provided underneath with annular radiating fins 153. The radiating fins 153 alternate with similar annular radiating fins 154 provided on the bottom of the enclosure 12. Around the upper side of the pan 151 is a trough 156 for oil or other suitable sealing medium, neutral and non-absorbent to the ammonia or other volatile product under treatment, and an annular seal ring 157 depends from the drain ring 41 extending into the trough 156 an thus prevents communication between the upper part of the enclosure 12 and the lower part thereof. Surrounding the lower part of the enclosure 12 is an enclosing wall 158 forming a chamber 159 in which is provided a downwardly extending baffle 161 and an upwardly extening baffle 160.

The substance in solution such as aqueous ammonia is admitted from a container 162 through a conduit 163 having a valve 164 therein controlled by a valve handle 166. The conduit 163 leads through the chamber 159 around the baffle 160 and outwardly of the chamber to enter the bottom of the enclosure 12 at 167. Upon entering the enclosure, it travels over the rings 154 and under the radiating rings 153 toward the outer wall of the container 12 having heat transmitted to it from the pan 151, evaporating the aqua ammonia from the solution.

Along the outer wall of the enclosure 12 it proceeds upwardly to an annular trough 168 in which may be disposed steam pipes 169 for further heating it and taking out the last traces of ammonia. The gaseous ammonia distilled off is carried upwardly through a conduit 171 surrounded by a condenser 172 to a conduit 173 into the upper part of the enclosure 12. Where the pressure in the upper part of the enclosure is substantially the same as that in the lower part, the gaseous ammonia may pass directly through a conduit 173 provided with a valve 174. If there be a difference in pressure, the valve 174 may be closed and a pump 176 utilized to convey the gaseous ammonia into the upper part of the enclosure 12 and to the pan 151.

The hot aqueous residue passes over the outer edge of the trough 168 downwardly into the chamber 159 and upwardly under the baffle 161 and downwardly over baffle 160 in counter-current contact flow to entering aqua ammonia in conduit 163, to which it gives up a part of its heat. It then passes out through a conduit 177 into a discharge basin 178. Disposed within the basin 178 is a float 179 connected by means of a link 181 to the valve handle 166. Inasmuch as the specific gravity increases as the ammonia is distilled from its solution, the float 179 is made to respond only to liquid of a greater specific gravity than the introduced solution and will then rise and open the valve 164 to admit more aqueous solution into the bottom of the enclosure 12.

Figure 11:
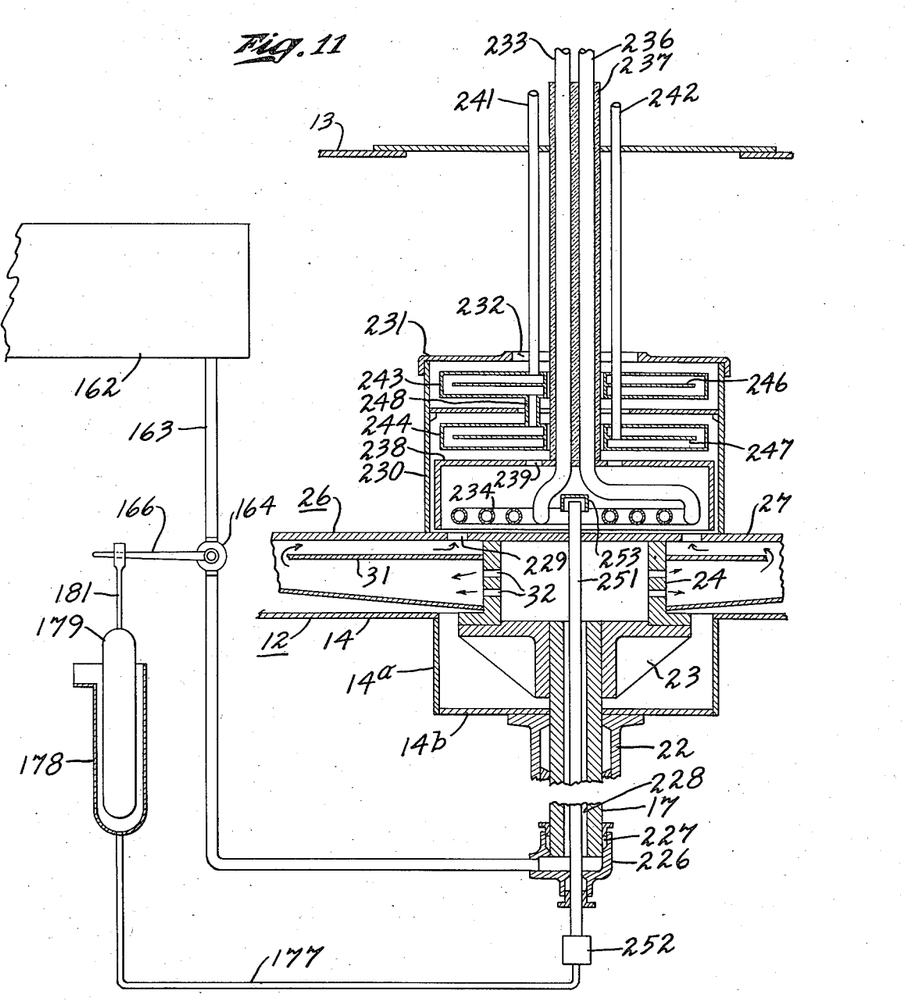
Fig. 11 is a detail sectional view showing a further modified form of mixing apparatus and embodying means for distilling off volatile constituents of the reacting components.

In Fig. 11, I show a further modified form of apparatus for performing the same functions as those just described in reference to Fig. 8. The rollers, pan drive, hood enclosure and other factors are the same as hereindescribed. Where parts utilized in this modification are the same as those heretofore disclosed, like numerals are used to indicate them. Description of the apparatus will perhaps be clearer by reference to flow of material therethrough.

Aqua ammonia from tank 162 is passed through pipe 163, its feed being controlled through valve 164, responsive to specific gravity of discharged aqueous residue passing through basin 178, raising float 179, which through link 181 and handle 166 actuates said valve. This aqua ammonia then passes through swivel coupling 226, which provides a tight stationary joint with stuffing box 227, with downward extension of hollow drive shaft 17, then upwardly through annular space 228 of said hollow shaft, through ports 32 around baffle 31, then through ports 229 into cylindrical vaporizing chamber 230. This vaporizing chamber is built integrally and revolves with the pan 26. The cylindrical vaporizing chamber 230 is provided with a cover 231, which cover has a relatively wide opening 232 for the passage of ammonia vapor into the enclosure 12.

Extending downwardly through the cover 13 of the enclosure 12 is a steam pipe 233 communicating with a coil 234 positioned within the vaporizing chamber 230 near the bottom thereof. A steam pipe 236 passes upwardly and outwardly from the coil 234 so as to permit the passage of steam through the said coil. Surrounding the two pipes 233 and 236 is a casing 237 suitably packed with heat insulating material and which extends downwardly around the pipes to a point near the coil 234. Supported from the casing 237 is a hood 238 which encloses the coil 234. The hood 238 is provided with ports 239 in its upper portion so that ammonia vapors distilled off from the aqua ammonia heated by the coil 234 may pass upwardly into the upper part of the vaporizing chamber 230.

Extending downwardly through the cover 13 of the enclosure 12, out of contact with the casing 237, is a water inlet pipe 241 and a water outlet pipe 242. These pipes connect to and support a condenser apparatus comprising two hollow disk-like members 243 and 244 positioned within the vaporizing chamber 230. The pipe 241 connects to the upper member 243 while the pipe 242 connects to the lower member 244. The members 243 and 244 are provided with interior baffles 246 and 247 to insure water contacting and cooling the outer walls of the disk-like members.

Water passing through the conduit 241 into the hollow member 243 traverses that member around the baffle 246 and then passes through a conduit 248 connecting the two members and into the lower member 244. The cooling water then traverses the cooling member 244 around the baffle 247 and passes out of the apparatus through the conduit 242.

The ammonia vapors distilled off by heat in the steam coil 234 pass upwardly to contact with the condenser members 243 and 244 where water vapor condenses therefrom to return to the vaporizing chamber 230. The ammonia vapor then passes on out through the opening 232 to the enclosure 12 for chemical combination with other constituents as hereinbefore described.

Water from which the ammonia vapor has been distilled off passes outwardly of the apparatus through a conduit 251 down through the hollow shaft 17 through a swivel connection 252 to the conduit 177 and drain basin 178, as heretofore described. In order to prevent the escape of ammonia vapor with the water, a water seal cap 253 is provided over the upper end of the conduit 251.

Figures 9, 10:
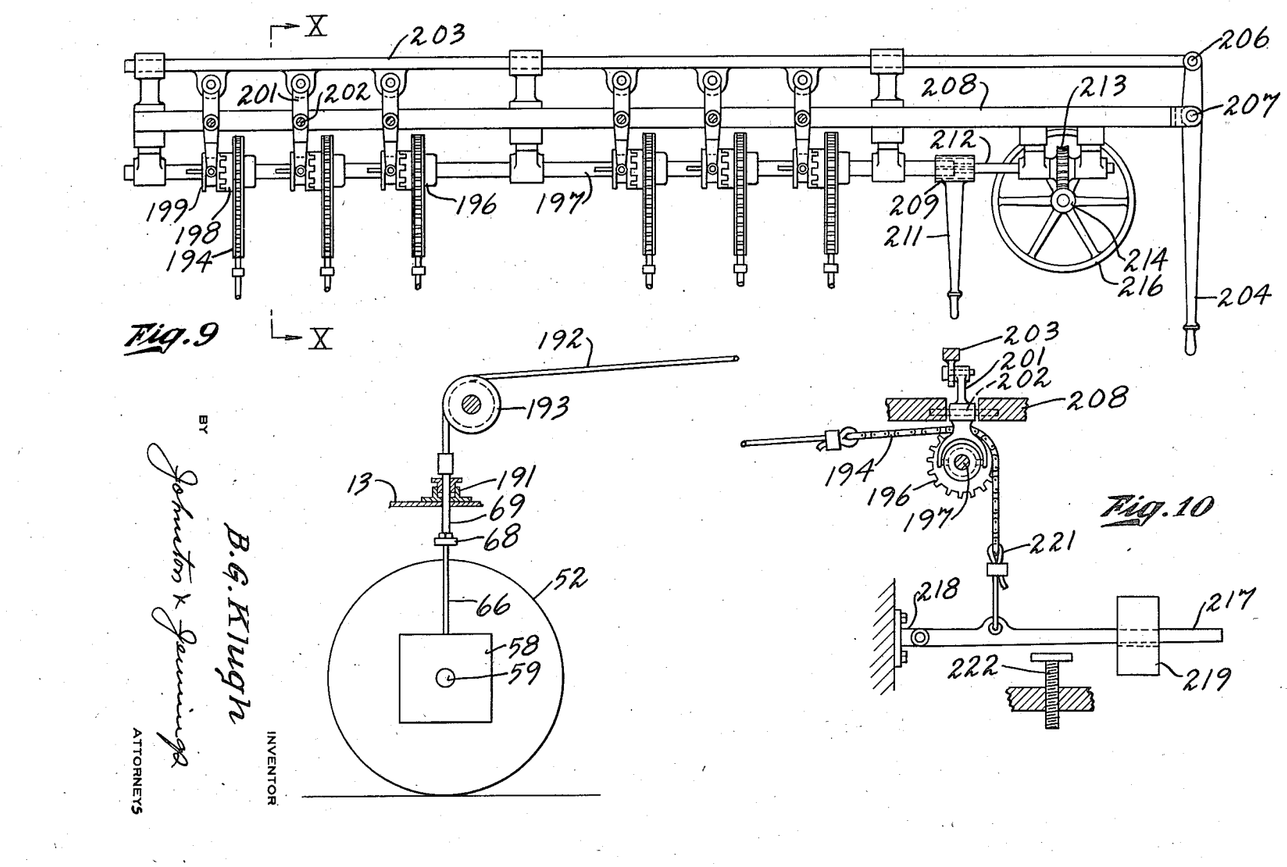
Fig. 9 is a view in elevation showing a modified form of support for the muller rollers.
Fig. 10 is a sectional view taken along the line X—X of Fig. 9.

Referring to Figs. 9 and 10 of the drawings, I show a modified means of support for the muller rollers 52 whereby they may be raised or lowered out of the way of materials in the pan 26 and may have their weight counterbalanced in part for the kneading of the materials in the pan. In accordance with this modification, I pass each of the rods 69 utilized in supporting the individual rollers 52 through a stuffing box 191 provided on the cover 13 of the enclosure 12, to prevent the escape of pressure from within the enclosure. Connected to the upper end of each of the rods 69 is a flexible cable 192 passing over a sheave 193. The cable 192 is connected at its other end to a sprocket chain 194 passing over a sprocket wheel 196 loosely mounted on shaft 197. Provided on each of the sprockets 196 is a clutch element 198 which cooperates with a second clutch element 199 splined to shaft 197. The clutch elements 199 are all operated by means of similar levers 201 pivoted at 202 and connected at their upper ends to a slide bar 203. The slide bar 203 is operated by means of a lever 204 connected at 206 to the slide bar and at 207 to a supporting bar 208 to which the clutch levers are pivoted. By means of the lever 204 all of the clutches 198 and 199 may be engaged or disengaged with their respective sprockets 196.

The shaft 197 at one end thereof may be connected through a clutch 209 and lever 211 to a shaft 212. The shaft 212 has mounted thereon a worm gear 213 which cooperates with the worm 214, the latter being operable by means of a hand wheel 216.

Whenever it is desired to raise the rollers 52 out of the way, the clutches 198 and 199 are engaged and the shaft 201 connected to the shaft 212 by means of the clutch 209, whereupon the hand wheel 216 may be rotated to raise the rollers out of the way.

In order to counterbalance the weight of the rollers, I provide a weight arm 217 pivoted to a stationary part 218 and carrying a sliding weight 219 on its outer end. The weight arm 217 is connected at 221 to the sprocket chain 194 after it passes over the sprocket wheel 196.

With the arrangement just described, the clutches 198 and 199 may be disengaged by means of the lever 204 and the weight of each roller may then be counterbalanced by the sliding weight 219 so as to exert the degree of pressure required on the materials in the pan. Adjusting screw 222 beneath the lever 217 provides a limit for the movement of the lever 217. By means of this adjusting screw the rollers may be subjected to a counter-balancing influence for a limited height from the surface of the pan, after which they will rest at full load upon any thicker bed of material passing under them.

The feature has value in kneading certain characters of salt paste in which there is a tendency to temporarily accumulate large aggregates, against a deflecting plate. When such aggregate breaks away from the plate and passes under the next roller it is desirable to break it down to the level of the average bed under kneading action. By this selective weight arrangement, the roller under which such a large mass passes automatically exerts its full weight upon it, without disturbing the controlled lighter weight of rollers upon other portions of the normal thickness of bed. The adjusting screw 222 permits putting this detail of control out of service where desired.

The corresponding control function, in my alternative weight control by air cylinders is shown in Fig. 2, whereby adjusting screw 80 provides means for limiting the travel of piston 73, with the same effect in selective control as that just described.

From the foregoing it will be apparent that I have devised an improved apparatus for the production of chemical salts, having a wide field of application and usefulness, and one wherein various chemical processes may be carried through to completion in the one piece of apparatus which have heretofore required several. It will furthermore be apparent that hydrous salts heretofore produced by way of crystallization with definite water of crystallization may be produced with my improved apparatus with a predetermined water content differing from that determined by the crystallization of the salt.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In apparatus for the production of chemical salts, a rotary pan, enclosing walls for the pan, a cover for the enclosing walls, muller rollers journalled within the enclosing walls and adapted to roll in the pan as it is rotated, means for introducing the chemical constituents of the salts to be formed through the enclosing means into the pan, means disposed above the pan beneath the hood for condensing any water evaporated by the heat of reaction and retaining said water, and means for removing said condensed water from the enclosing means and for returning water to the reaction mixture in the pan.

2. In apparatus for the production of chemical salts, a rotary pan, enclosing walls for the pan, a cover for the enclosing walls, muller rollers journalled within the enclosing walls and adapted to roll in the pan as it is rotated, means for introducing the chemical constituents of the salts to be formed through the enclosing means into the pan, means disposed above the pan beneath the hood for condensing any water evaporated by the heat of reaction and retaining said water, means for removing said condensed water from the enclosing means and for returning water to the reaction mixture in the pan, and means to counter-balance in part the weight of the rollers.

3. In apparatus for the production of chemical salts, a rotary mixing pan, a pressure resisting enclosure for the pan, means for introducing the materials to be treated through the enclosure into the pan, grinding and kneading means cooperating with the pan as it is rotated, condensing means located within the enclosure above the mixing pan, reservoir means cooperating with the condensing means for receiving and storing the condensate within the enclosure, controlled means for returning the condensate to the materials in the pan as required, and means for removing the condensate from the reservoir to the exterior of the enclosure.

4. In apparatus for the production of chemical salts, a rotary mixing pan, a pressure resisting enclosure for the pan, means for introducing the materials to be treated through the enclosure into the pan, grinding and kneading means cooperating with the pan as it is rotated, condensing means located within the enclosure above the mixing pan, reservoir means cooperating with the condensing means for receiving and storing the condensate within the enclosure, control means for returning the condensate to the material in the pan as required, and balanced valve means responsive to hydrostatic pressure from the reservoir means and to gaseous pressure within the enclosure for removing the condensate from said reservoir means as formed.

5. In an apparatus for producing chemical salts involving a reaction between ammonia and an acid and wherein aqua ammonia is utilized as a starting material, means for distilling the currently required ammonia by heat from its neutralization, said means comprising a gas tight enclosure, a rotary pan within the enclosure, a closed circuit means for passing aqua ammonia in heat transfer relation with the pan bottom, a vaporizing chamber communicating with the pan bottom, sealed discharge means for the water residue, and gas communication means from said vaporizing chamber to said enclosure.

6. In apparatus for producing chemical salts, a gas tight enclosure, a rotary pan disposed within the enclosure, a hollow bottom below the pan floor, a closed circuit means for passing a heat transfer medium therethrough in contact with said floor of said pan, means for passing steam through said enclosure for replacing air therein, a surface condenser in said enclosure, a condensate receiving basin arranged below the condenser, and sealed exit means for liquid from said basin through the walls of said enclosure.

7. In an apparatus for producing chemical salts, a gas tight enclosure, a rotary pan disposed within the enclosure, a hollow bottom for the pan floor, a closed circuit means for passing a heat transfer medium therethrough in contact with said floor of said pan, means for passing steam through said enclosure for replacing air therein, a surface condenser in said enclosure, a condensate receiving basin arranged beneath the condenser, sealed exit means for liquid from said basin through the walls of said enclosure, and vacuum producing means communicating with said hood space.

8. In apparatus for producing chemical salts, the combination of a rotary mixing pan, a pressure tight enclosure for the pan, means for introducing at least a part of the materials to be utilized through the enclosure directly into the pan, valve controlled means for introducing other components in aqueous solution into the enclosure in heat transfer relation with the pan whereby to utilize the heat of reaction in separating said material in gaseous form from the water solution, means for conveying the gaseous material to the pan to react with the other constituents therein, and means for automatically removing water from the enclosure as the gaseous substance in solution therein is evaporated therefrom.

9. In apparatus for producing chemical salts, the combination of a rotary mixing pan, a pressure tight enclosure for the pan, means for introducing at least a part of the materials to be utilized through the enclosure directly into the pan, valve controlled means for introducing other components in aqueous solution into the enclosure in heat transfer relation with the pan, whereby to utilize the heat of reaction in separating said material in gaseous form from the water solution, means for conveying the gaseous material to the pan to react with the other constituents therein, automatic means for removing water from the enclosure as the gaseous substance in solution therein is evaporated therefrom, and means responsive to variations in the specific gravity of the water removed from the said enclosure for admitting further solution thereto.

10. In apparatus for the production of chemical salts, wherein ammonia is utilized as one of the constituents of said salts, the combination of a rotary mixing pan, a pressure tight enclosure for the pan, means for introducing aqueous ammonia into the lower part of the enclosure in heat transfer relation with the pan, liquid sealed means between the pan and the upper portion of the enclosure, means for introducing the other constituents of the salt to be produced through the upper part of the enclosure directly into the pan, means for conveying distilled ammonia from the lower part of the enclosure to the upper part thereof to react with the other constituents in the pan, additional means for heating the aqueous solution in the lower part of the enclosure subsequent to heating derived from pan, means for removing water from the enclosure as the ammonia is distilled therefrom in countercurrent heat exchange relation to incoming aqueous ammonia feed, and means operable responsive to variations in the specific gravity of the water removed for controlling the introduction of further aqueous ammonia.

11. A method of producing chemical salts by reaction of the chemical components thereof, which comprises bringing together the reacting components thereof, subjecting said components to pressure as the reaction proceeds, grinding the products of the reaction as said reaction proceeds, evaporating water brought in with said components by the heat of the reaction, condensing the vaporized water, and controlling the returner of moisture to the salts so produced to a predetermined degree.

12. A method of producing chemical salts by reaction of the chemical components thereof, which comprises bringing together the reacting components thereof, subjecting said components to pressure as the reaction proceeds, grinding the products of the reaction as said reaction proceeds, evaporating water brought in with said components by the heat of the reaction, condensing the vaporized water, controlling the return of moisture to the salts so produced to a predetermined degree, and kneading the salts so produced to form a mobile paste.

BETHUNE G. KLUGH.